US012799754B2

(12) United States Patent
Ramos

(10) Patent No.: US 12,799,754 B2
(45) Date of Patent: Nov. 17, 2026

(54) SYSTEMS AND METHODS FOR POOL BEAMS

(71) Applicant: BELGRAVIA WOOD LIMITED, Hong Kong (HK)

(72) Inventor: Jaime Ramos, Moorpark, CA (US)

(73) Assignee: Belgravia Wood Limited, Hong Kong (CN)

( * ) Notice: Subject to any disclaimer, the term of this patent is extended or adjusted under 35 U.S.C. 154(b) by 46 days.

(21) Appl. No.: 19/081,219

(22) Filed: Mar. 17, 2025

(65) Prior Publication Data

US 2025/0215715 A1 Jul. 3, 2025

Related U.S. Application Data

(62) Division of application No. 18/586,228, filed on Feb. 23, 2024, now Pat. No. 12,276,128, which is a division of application No. 17/448,572, filed on Sep. 23, 2021, now Pat. No. 11,946,275.

(60) Provisional application No. 63/198,006, filed on Sep. 23, 2020.

(51) Int. Cl.
*E04H 4/00* (2006.01)
*F16B 7/18* (2006.01)

(52) U.S. Cl.
CPC ........... *E04H 4/0056* (2013.01); *F16B 7/185* (2013.01)

(58) Field of Classification Search
CPC ............................... E04H 4/0056; F16B 7/185
USPC ............................................................. 4/506
See application file for complete search history.

(56) References Cited

U.S. PATENT DOCUMENTS

| | | | | |
|---|---|---|---|---|
| 2,378,159 | A | 6/1945 | Royer | |
| 5,083,327 | A | 1/1992 | Gillebaard | |
| 6,477,721 | B2 | 11/2002 | Lee | |
| 6,643,858 | B2 * | 11/2003 | Lee | E04H 4/0056 4/506 |
| 11,692,573 | B2 | 7/2023 | Lin | |
| 11,946,275 | B2 * | 4/2024 | Ramos | E04H 4/0056 |
| 12,276,128 | B2 * | 4/2025 | Ramos | F16B 7/0493 |

(Continued)

FOREIGN PATENT DOCUMENTS

| | | | |
|---|---|---|---|
| CN | 208169272 | U | 11/2018 |
| WO | 2020058854 | A1 | 3/2020 |

OTHER PUBLICATIONS

French Search Report for French Patent Application No. FR2109998 dated Apr. 10, 2024.

*Primary Examiner* — Huyen D Le
(74) *Attorney, Agent, or Firm* — Finnegan, Henderson, Farabow, Garrett & Dunner, LLP

(57) ABSTRACT

Disclosed are embodiments of a frame for a pool that may be installed as a series of beams and frame members, wherein a first beam and a second beam may be configured to connect to a frame member to form a portion of the frame of the pool, wherein the first beam and the second beam may include provisions for attaching to the frame member, wherein the orientation of the first beam may be set relative to the second beam so that a circumference of a pool is formed when the series of beams and frame members are each connected. In some embodiments, the frame member may include a receptacle, an insert, and a pin. In some embodiments, the receptacle may include a first protrusion portion for a first beam and a second protrusion portion for a second beam. In some embodiments, one or more pins may be used to attach the beams to the insert and the receptacle.

20 Claims, 13 Drawing Sheets

(56) References Cited

U.S. PATENT DOCUMENTS

| | | | | |
|---|---|---|---|---|
| 2001/0037620 | A1 | 11/2001 | Choi | |
| 2002/0042947 | A1* | 4/2002 | Chang | E04H 4/0056 4/506 |
| 2002/0042949 | A1 | 4/2002 | Lee | |
| 2017/0089085 | A1 | 3/2017 | Liu | |
| 2017/0356206 | A1 | 12/2017 | Huang | |
| 2019/0178275 | A1* | 6/2019 | Lin | E04H 4/0056 |
| 2020/0149570 | A1* | 5/2020 | Huang | E04H 4/0056 |

* cited by examiner

SYSTEMS AND METHODS FOR POOL BEAMS

RELATED APPLICATIONS

This application is a divisional of U.S. application Ser. No. 18/586,228 filed Feb. 23, 2024, which is a divisional of U.S. patent application Ser. No. 17/448,572, filed Sep. 23, 2021 (now U.S. Pat. No. 11,946,275), which claims the benefit of U.S. Provisional Application No. 63/198,006 filed on Sep. 23, 2020, the entire contents and substance of which are incorporated herein by reference in their entirety.

FIELD

The present disclosure relates generally to pool beams, including apparatus, systems, and methods for installing pool beams.

BACKGROUND

An above ground pool is constructed from various pool structures. Such pool structures include a pool frame that supports a pool liner and contains water within and/or around the pool frame and provides the support to hold water against the weight of the water, the liner, and any apparatus associated with maintaining and using the above ground pool. The above ground pool, in particular, may take advantage of avoiding the cost and effort involved with digging or otherwise excavating a space for a pool. Additionally, above-ground pools may take advantage of being installed in locations where digging or excavating is impracticable or impossible. Pool frames for above ground pools are heavy and difficult to transport effectively. Thus, it is desired to have a pool frame that is easily installable, is secure against the weight of the water and/or other apparatus associated with maintenance and/or use of the pool, and where the installation is efficient and repeatable.

SUMMARY

One aspect of an exemplary disclosure relates to a frame for a pool that may be installed as a series of beams and generally vertical frame members. One or more beams may be configured to connect to one or more generally vertical frame members to form the frame of the pool. A frame member may be configured to connect to a first beam and a second beam. The beam may include provisions for attaching to the frame member. The frame member may include a receptacle, an insert, and a pin. In some embodiments, the receptacle may include a first protrusion portion for a first beam and a second protrusion portion for a second beam. One or more pins may be used to attach the beams to the insert and the receptacle. The pin may comprise a threaded portion, a locking feature, and/or a clip.

One aspect of an exemplary disclosure relates to a pool frame comprising a frame member including a receptacle, a first beam including a first connecting end, a second beam including a second connecting end, an insert that mates against the receptacle and includes a first protrusion portion that connects to the first connecting end and a second protrusion portion that connects to the second connecting end, a first pin that couples the first beam against the receptacle via the insert, and a second pin that couples the second beam against the receptacle via the insert.

One aspect of an exemplary disclosure relates to a pool frame comprising a frame member including a receptacle, a first beam including a first connecting end, a second beam including a second connecting end, an insert that mates against the receptacle and passes through the first connecting end and the second connecting end, a cap that contains the first connecting and the second connecting end in a position external to the insert.

One aspect of an exemplary disclosure relates to a pool frame comprising a frame member, a first beam, a second beam, an upper joint that connects to the first beam, a lower joint that connects the second beam to the upper joint and the second beam, a pin that locks the upper joint in an orientation relative to the lower joint via reception in a first hole in the upper joint and a second hole in the lower joint, wherein the upper joint mates against the lower joint. In some embodiments, the upper joint may include a first flat surface and the lower joint may include a second flat surface, and the first flat surface may mate against the second flat surface.

It is to be understood that both the foregoing general description and the following detailed description are exemplary and explanatory only and are not restrictive of the invention. The accompanying drawings, which are incorporated in and constitute a part of this specification, illustrate several exemplary embodiments and together with the description, serve to outline principles of the exemplary embodiments.

DETAILED DESCRIPTION

Reference will now be made in detail to exemplary embodiments, some examples of which are shown in the accompanying drawings.

Exemplary disclosed embodiments include apparatus, systems, and methods for a pool frame. The pool frame may include a beam and a frame member. The beam may connect to the frame member via a joint connection. The joint connection may be configured to support the weight of the water, pool liner, and/or apparatus for maintaining or using a pool. For example, in some embodiments, a pool liner may be installed within a volume within a frame. The liner may include a polymer that extends below and around a volume of water. The liner may be connected to the frame to contain the water. The water may be used for a variety of reasons including, for example, recreation. The frame may form a shape to contain water within the shape. In some embodiments, the shape of the frame may be circular. The disclosed embodiments provide for a secure, replicable installation of the pool frame. The disclosed embodiments may include one or more features including indicators or locating features so that pool beams may be installed in a radial orientation relative to each other to form a circumference of a pool.

Although vertical frame members are described herein, a variety of frame members are contemplated that are not limited to strictly vertical orientations. For example, frame members may be at an angle from vertical and connect to beams in a number of orientations. It is contemplated that frame members may be triangular. It is contemplated that frame members may include diagonal supports. It is contemplated that frame members may be circular or elliptical.

FIGS. 1A-1B, 2A-2B, 3A-3B, 4A-4B, and 5A-5B illustrate non-limiting examples of a pool frame consistent with the present disclosure. It is understood that the examples and embodiments described represent simplified descriptions used to facilitate understanding of the principles and methods of this disclosure.

Figure 1A:
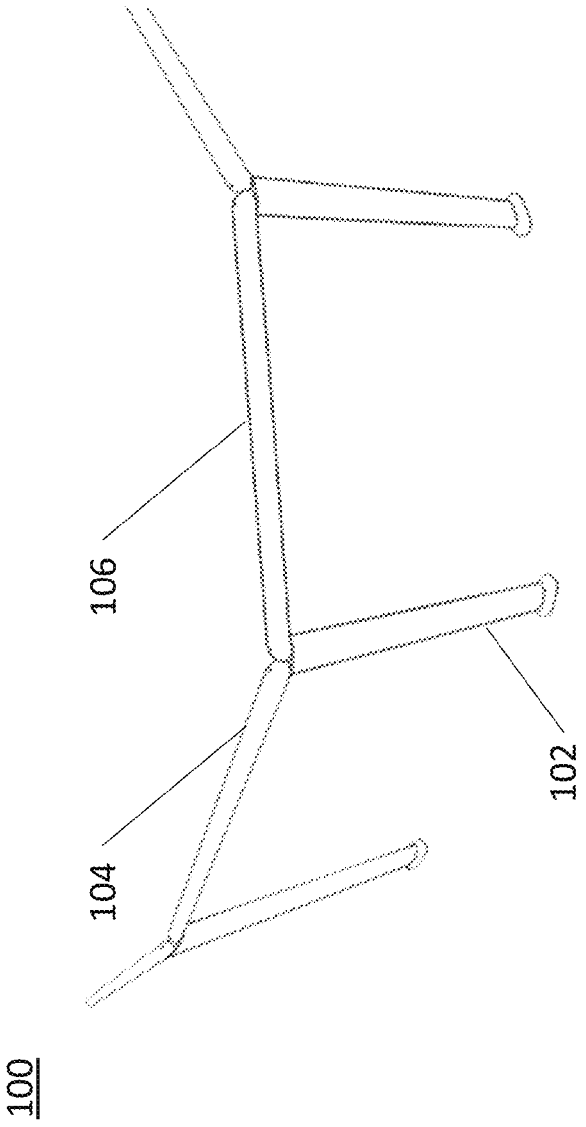
FIGS. 1A-1B illustrate exemplary embodiments of a pool frame.
Figure 1B:
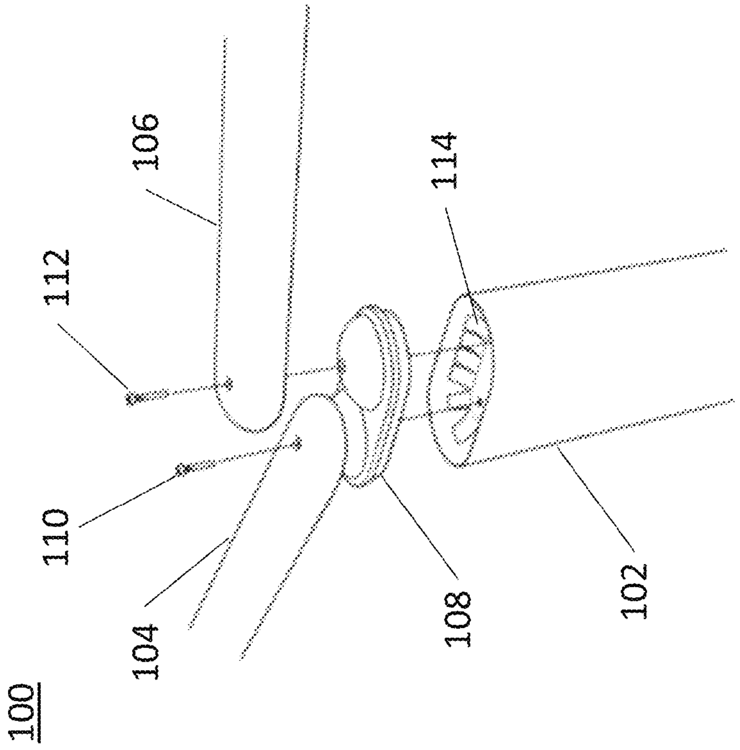

FIGS. 1A-1B illustrate exemplary embodiments of pool frame 100. FIG. 1A shows an exemplary embodiment of pool frame 100. In some embodiments, pool frame 100 may include frame member 102, first beam 104, and second beam 106. Frame member 102 may include a generally or substantially vertical frame to transfer a portion of the weight of a pool to the ground. Frame member 102 may stand by itself, with the support of other frame members, or it may be connected to a floor surface by being buried, being bolted to a floor connecting member, or being encased in concrete.

Frame member 102 may connect to first beam 104 and second beam 106. First beam 104 and second beam 106 may be configured to connect to a top portion of frame member 102 so as to transfer weight via frame member 102 to the floor surface. Additional frame members and beams may be used to form a circumference of a pool. The number of frame members and beams may be adjusted to increase or decrease the size of the pool, and frame members and beams may be interchangeable to allow for replicable installation.

FIG. 1B shows an exemplary embodiment of pool frame 100. Pool frame 100 may include insert 108, first pin 110, second pin 112, and receptacle 114. First beam 104 and second beam 106 may connect to frame member 102 via insert 108. Insert 108 may include a protrusion portion that mates to a recessed portion of a mating beam (e.g., first beam 104, second beam 106). For example, as shown, insert 108 may include a first protrusion portion that mates to first beam 104 and insert 108 may include a second protrusion portion that mates to second beam 106. The protrusion portion may be rounded such that the mating beam may be mounted in a number of orientations relative to another mating beam. Insert 108 may be configured to attach to at least one of substantially vertical frame member 102 and receptacle 114. Insert 108 may be press fit into at least one of frame member 102 and receptacle 114. In some embodiments, insert 108 may include snapping portions that correspond to snapping portions on receptacle 114. Receptacle 114 may be configured to receive first pin 110 and second pin 112. In some embodiments, first pin 110 and second pin 112 may include a threaded portion and may be threaded into receptacle 114. In some embodiments, receptacle 114 may include a plate that is welded to frame member 202 where the plate include at least one of a slot or threaded portion to receive pins 110, 112. In some embodiments, first pin 110 and second pin 112 may be pressed into receptacle 114. In some embodiments, insert 108 may connect to frame member 102 and/or receptacle 114 via a press fit connection.

Figure 2A:
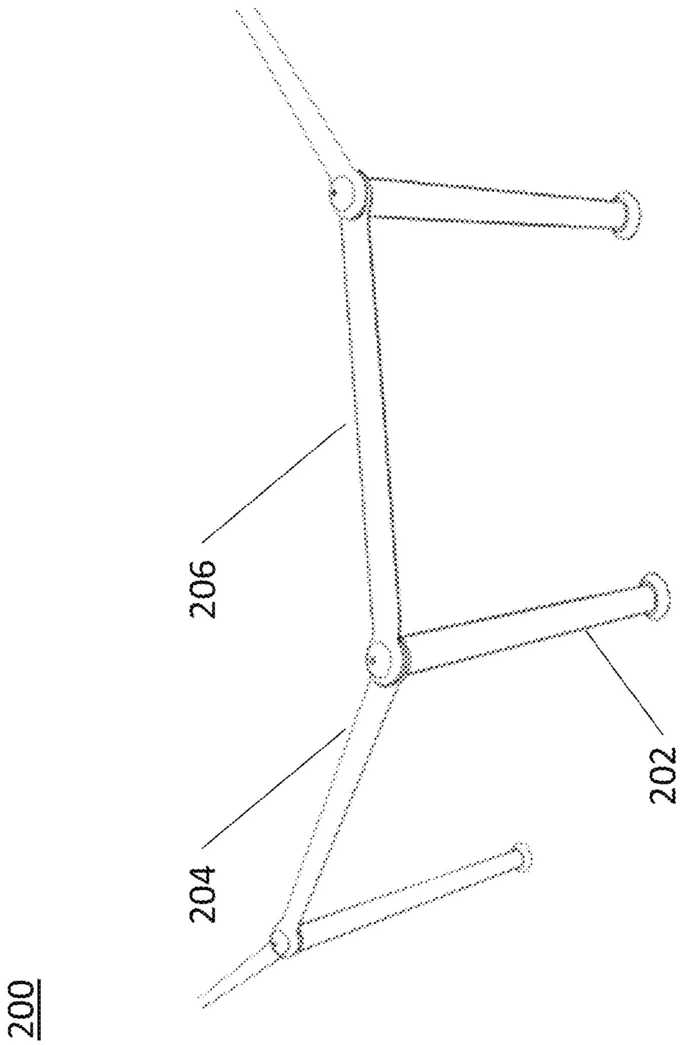
FIGS. 2A-2B illustrate exemplary embodiments of a pool frame.
Figure 2B:
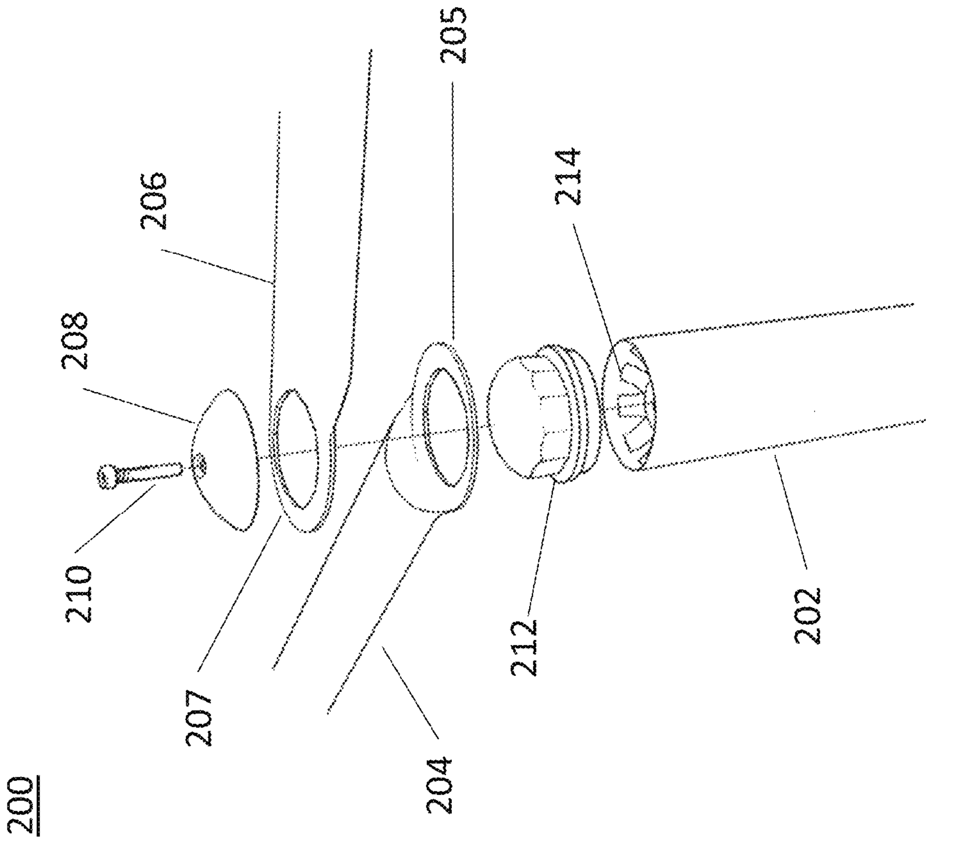

FIGS. 2A-2B illustrate exemplary embodiments of pool frame 200. Certain features of pool frame 200 are not shown or discussed in these examples where such features may be similar to those discussed for other embodiments.

FIG. 2A illustrates an exemplary embodiment of pool frame 200. Pool frame 200 may include frame member 202, first beam 204, and second beam 206.

FIG. 2B illustrates an exemplary embodiment of pool frame 200. First beam 204 may include first connecting end 205. Second beam 206 may include second connecting end 207. First and second connecting ends 205, 207 may include an orifice on each connecting end to connect to frame member 202. Pool frame 200 may include insert 212, receptacle 214, cap 208, and pin 210. Connecting ends 205, 207 may be configured to fit onto insert 212. Connecting ends 205, 207 may include a number of flat interior surfaces to mate against a number of flat exterior surfaces of insert 212. Connecting ends 205, 207 may each include an indicator so that connecting ends 205, 207 may be oriented relative to another indicator on insert 212. The indicators on connecting ends 205, 207 and/or insert 212 may be aligned so the flat interior surfaces align such that first beam 204 may be positioned relative to second beam 206 to form a portion of a desired circumference of a pool. The indicators may include a silk screen, tempo print, decal, or engraving. The indicators may indicate an angle, a circumference of a pool in distance (e.g., feet, meters, etc.), or a setting number that corresponds to a circumference of a pool (e.g., 1, 2, 3).

The angle of first beam 204 may be set relative to second beam 206 via the connection of the exterior and interior surfaces of connecting ends 205, 207 and insert 212. Cap 208 may mate against a top portion of insert 212 and/or connecting end 207. Pin 210 may pass through cap 208, insert 212 and into receptacle 214.

Figure 3A:
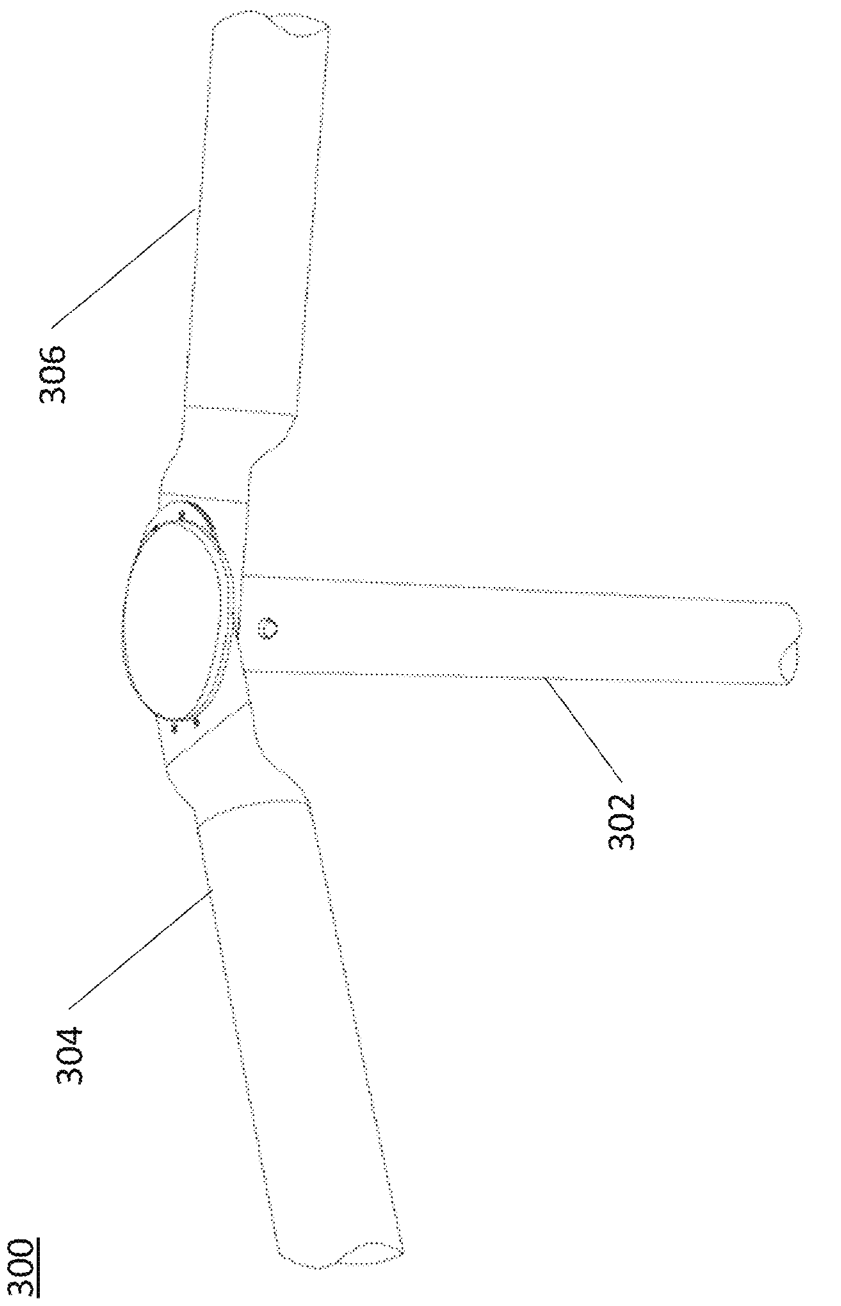
FIGS. 3A-3B illustrate exemplary embodiments of a pool frame.
Figure 3B:
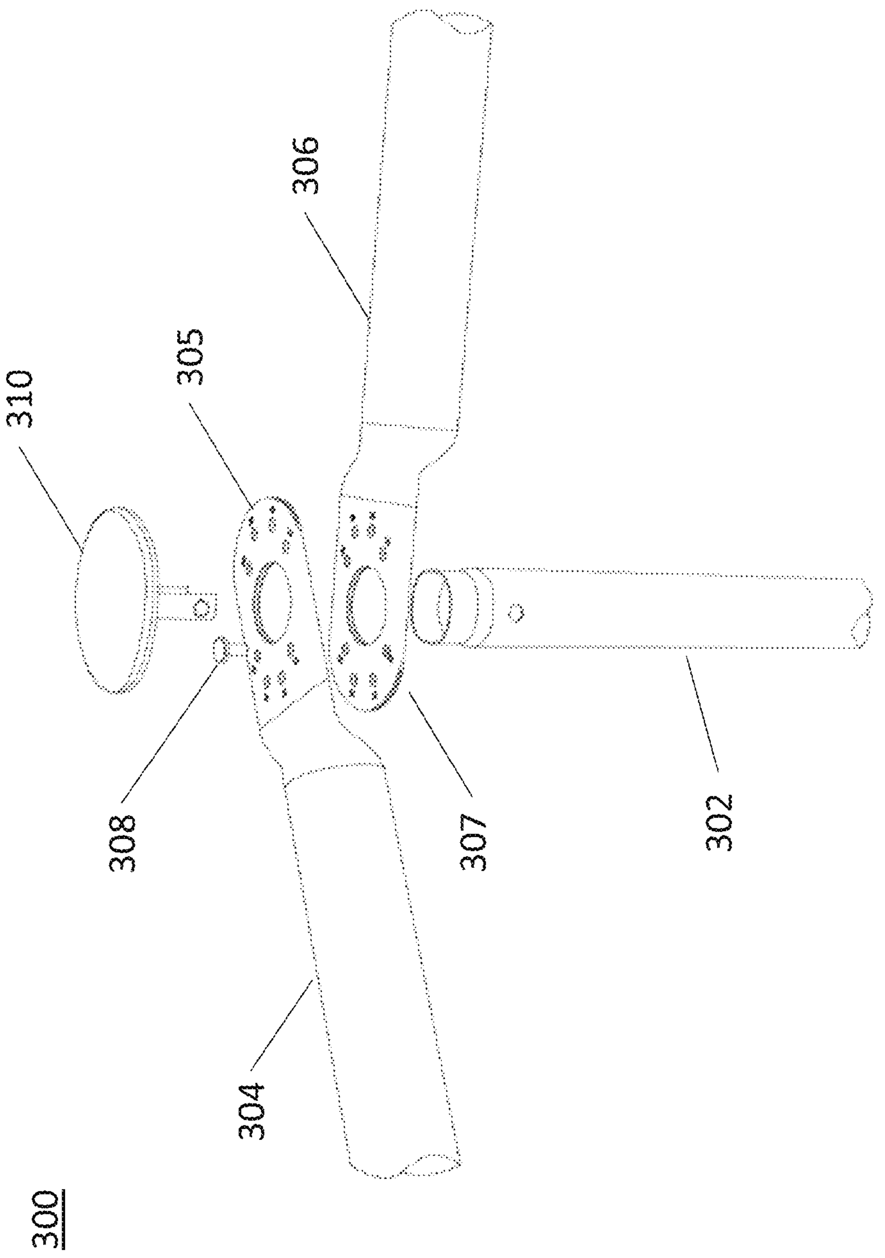

FIGS. 3A-3B illustrate exemplary embodiments of pool frame 300. Certain features of pool frame 300 are not shown or discussed in these examples where such features may be similar to those discussed for other embodiments.

FIG. 3A illustrates an exemplary embodiment of pool frame 300. Pool frame 300 may include frame member 302, first beam 304, and second beam 306.

FIG. 3B illustrates an exemplary embodiment of pool frame 300. Pool frame 300 may include locking cap 310 and pin 308. First beam 304 may include first connecting end 305. Second beam 306 may include second connecting end 307. First and second connecting ends 305, 307 may fit onto a mating end portion of frame member 302. First and second connecting ends 305, 307 may be flat so that surfaces of ends 305, 307 may be flush against each other and/or cap 310. First and second connecting ends 305, 307 may include one or more connection holes to receive pin 308. Connection holes of ends 305, 307 may be configured to allow for a specific circumference of a pool frame when all beams (e.g., beam 304, beam 306) are aligned and attached.

Connecting ends 305, 307 may each include an indicator so that connecting ends 305, 307 may be oriented relative to each other. The indicators on connecting end 305 and/or connecting end 307 may be aligned so first beam 304 may be positioned relative to second beam 306 to form a portion of a desired circumference of a pool. The indicators may indicate where to place pin 308 to achieve the desired circumference of the pool. The indicators may include a silk screen, tempo print, decal, or engraving. The indicators may indicate an angle, a circumference of a pool in distance (e.g., feet, meters, etc.), or a setting number that corresponds to a circumference of a pool (e.g., 1, 2, 3). The indicators may be visible through a hole, a window, or an aperture of the upper connecting end (e.g., connecting end 305). Receiving pin 308 may fix an orientation of first beam 304 relative to second beam 306. Locking cap 310 may include a locking portion to mate to a pin inserted through frame member 302. In some embodiments, locking cap 310 may mate to first member 302 via a threaded, adhesive, welded, and/or press fit connection. In some embodiments, locking cap 310 may clip onto a clip portion of first member 302, where locking cap 310 may be released via pressing on a portion of the clip.

Figure 4A:
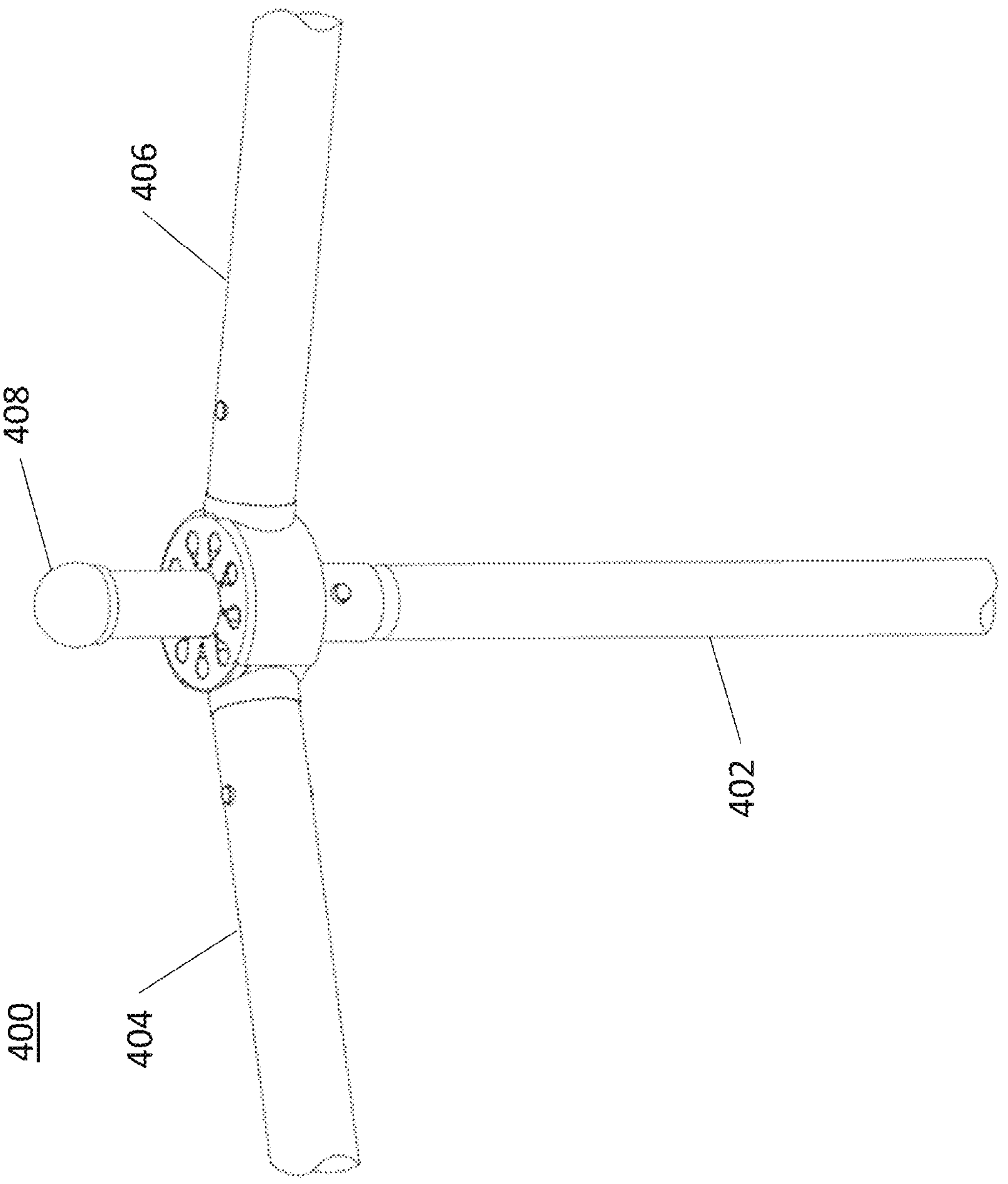
FIGS. 4A-4B illustrate exemplary embodiments of a pool frame.
Figure 4B:
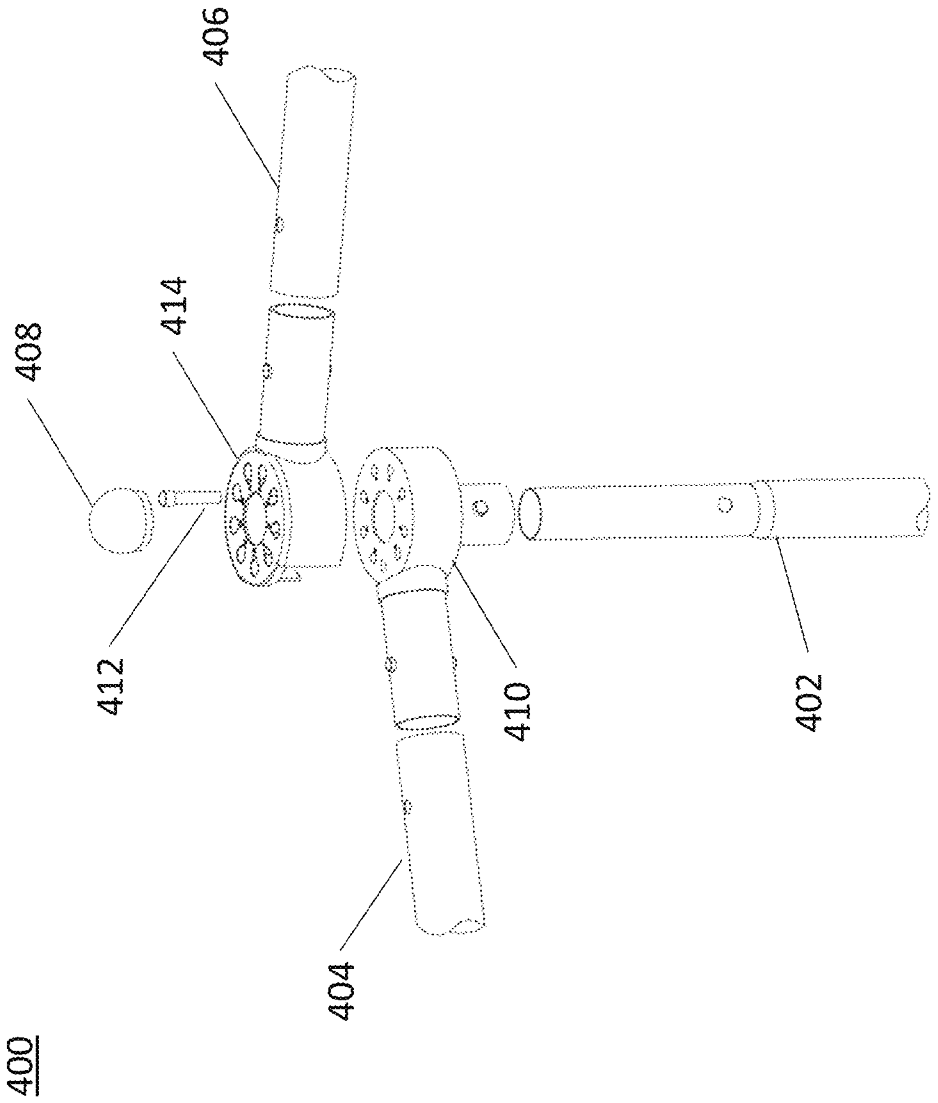

FIGS. 4A-4B illustrate exemplary embodiments of pool frame 400. Certain features of pool frame 400 are not shown or discussed in these examples where such features may be similar to those discussed for other embodiments.

FIG. 4A illustrates an exemplary embodiment of pool frame 400. Pool frame 400 may include frame member 402, lower beam 404, upper beam 406, and cap 408. Cap 408 may attach to a top portion of a connection of frame member 402, a portion of lower beam 404, and/or a portion of upper beam 406.

FIG. 4B illustrates an exemplary embodiment of pool frame 400. Pool frame 400 may include upper joint 414, lower joint 410, and pin 412. Lower joint 410 may connect to lower beam 404 and frame member 402. Lower joint 410 may include pin connections that connect when a first tube of lower joint 410 passes over lower beam 404 and when a second tube of lower joint 410 passes over frame member 402. Upper joint 414 may connect to upper beam 406. Upper joint 414 may include a pin connection that connects when a tube of upper joint 414 passes over second beam 406. Joints 410, 414 may each include an indicator so that joints 410, 414 may be oriented relative to each other. The indicators on upper joint 414 and/or lower joint 410 may be aligned so lower beam 404 may be positioned relative to upper beam 406 to form a portion of a desired circumference of a pool. Lower beam 404 and upper beam 406 may be positioned radially relative to each other. The indicators may be visible through a hole, a window, or an aperture of the upper connecting end (e.g., upper joint 414). The indicators may shown an alignment of a portion of upper joint 414 with lower beam 404. The indicators may indicate where to place pin 412 to achieve the desired circumference of the pool. The indicators may indicate an angle, a circumference of a pool in distance (e.g., feet, meters, etc.), or a setting number that corresponds to a circumference of a pool (e.g., 1, 2, 3). Pin connections described herein may include a spring that biases the pin outwards from an adjacent structural member. A mating hole for pin connections may include a slot to allow rotation of joints, frame members, and/or beams.

The angle of upper beam 406 may be set relative to lower beam 406 via an indicator on an exterior surface of upper joint 414, lower joint 410, and/or insert 212.

Pin 412 may pass through upper joint 414 to connect upper joint 414 to lower joint 410. Pin 412 may be threaded or may include a locking pin to affix pin 412 in a secure position. Pin 412 may pass through a top plate of upper joint 414. Upper joint 414 may include a cutout to receive a joint portion of lower joint 410. A side wall of the cutout may be adjustable to allow for different orientations of first beam 404 relative to upper beam 406. The top plate of upper joint 414 may mate against a top plate of lower joint 410. The top plates of upper joint 414 and lower joint 410 may have a number of holes to receive pin 412 that may be used to orient lower beam 404 relative to upper beam 406. Upper beam 404 and lower beam 406 may relatively level when upper joint 414 and lower joint 410 are connected.

Figure 5A:
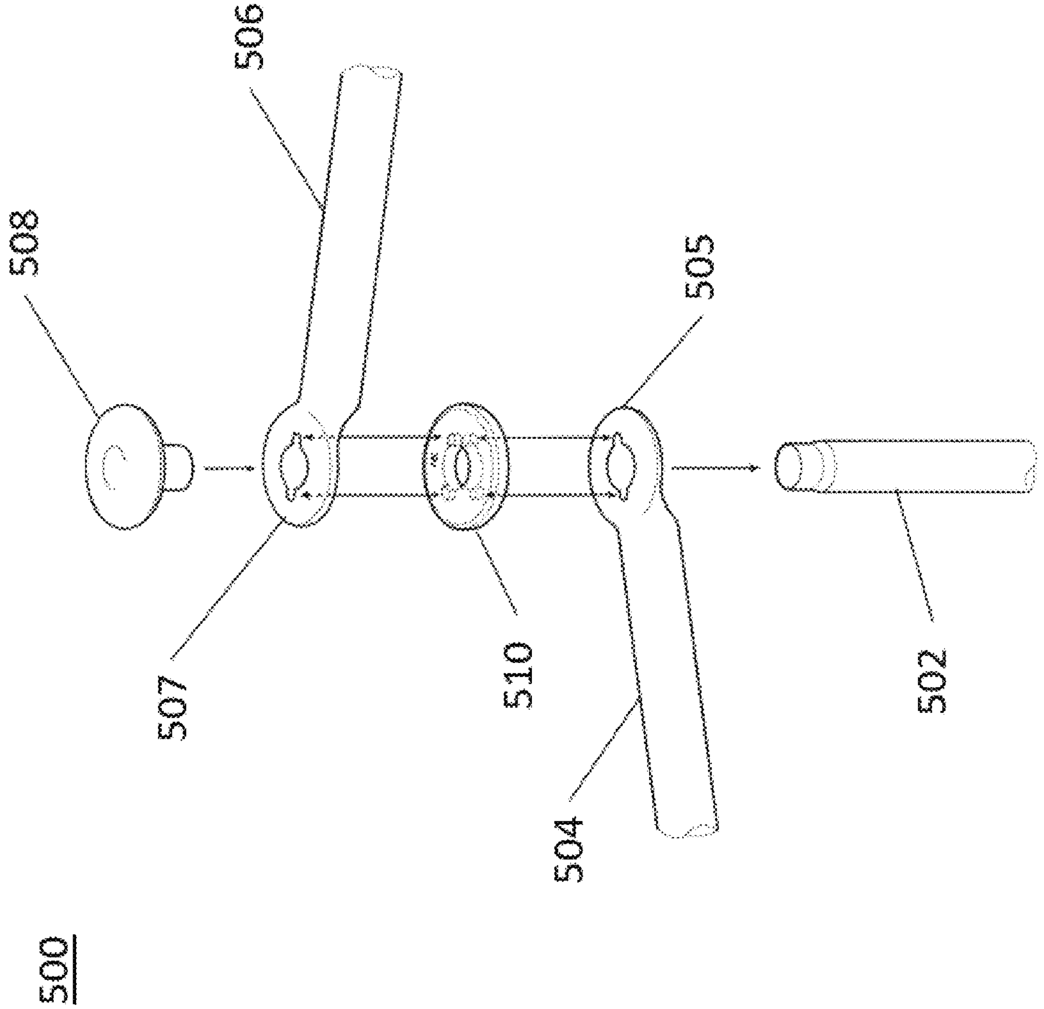
FIGS. 5A-5E illustrate exemplary embodiments of a pool frame.

FIG. 5A illustrates an exemplary embodiment of pool frame 500. Certain features of pool frame 500 are not shown or discussed in these examples where such features may be similar to those discussed for other embodiments. Pool frame 500 may include frame member 502, first beam 504, second beam 506, cap 508, and positioner 510. Cap 508 may attach to a top portion of a connection of frame member 502. An insert portion of cap 508 may press fit within and/or outside of a portion of member 502. Cap 508 may attach to a portion of position 510, a portion of first beam 504, and/or a portion of second beam 506. First beam 504 may include an end 505. Second beam 506 may include end 507. Ends 505, 507 may include a hole for an insert portion of member 502 and/or a bottom portion of cap 508. Ends 505, 507, respectively, may include a slot, a location hole, and/or a protrusion to connect to a corresponding portion of positioner 510. Positioner 510 may include locating portions, including a protrusion, slot, and/or location hole, to mate to corresponding portions of ends 505, 507, respectively. One or more pins and/or cap 508 may fit through slots and/or location holes of positioner 510 and/or ends 505, 507. In some embodiments, positioner 510 may include a first protruding portion that inserts into a first slot of end 505 and a second protruding portion that inserts into a second slot of end 507.

The locating portions of positioner 510 and ends 505, 507 may correspond when first beam 504 is at a desired orientation to second beam 506. The desired orientation may be at an angle that corresponds to a certain circumference of the pool. Positioner 510 may include mating portions for a specific circumference. In such embodiments, positioner 510 may include a marking that indicates the specific circumference. Positioner 510 may be replaceable with another positioner of a different circumference of the pool. Ends 505, 507 and/or positioner 510 may each include an indicator so that ends 505, 507 and positioner 510 may be oriented relative to each other. The indicators on ends 505, 507 and positioner 510 may be aligned so first beam 504 may be positioned relative to second beam 506 to form a portion of a desired circumference of a pool. The indicators may indicate how to locate ends 505, 507 and/or positioner 510 to achieve the desired circumference of the pool. The indicators may indicate an angle, a circumference of a pool in distance (e.g., feet, meters, etc.), or a setting number that corresponds to a circumference of a pool (e.g., 1, 2, 3). In some embodiments, positioner 510 may include an adjustable pin that locks in a location that corresponds to a desired circumference.

Figure 5B:
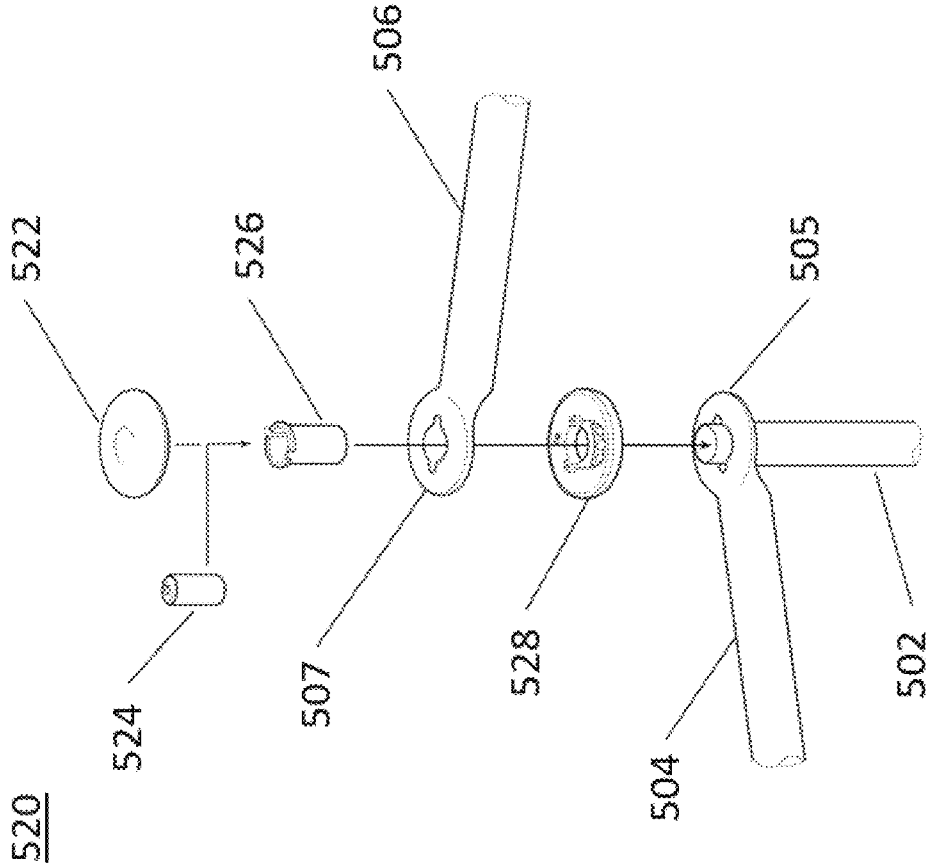

FIG. 5B illustrates an exemplary embodiment of pool frame 520. Certain features of pool frame 520 are not shown or discussed in these examples where such features may be similar to those discussed for other embodiments. Pool frame 520 may include cap 522, battery 524, enclosure 526, and positioner 528. Cap 522 may attach to enclosure 526 via adhesion, press fit, fastener, and/or threading. Battery 524 may be placed within enclosure 526. Battery 524 may include a rechargeable battery and/or a disposable battery. Enclosure 526 may include a conducting portion for conducting power from cap 522 to positioner 528. Enclosure 526 may be sealed from moisture or debris. In some embodiments, enclosure 526 may fit within a portion of vertical frame member 502. In such embodiments, enclosure 526 may be press fit into vertical frame member 502. Positioner 528 may include light-emitted diodes (LEDs) for aesthetic and/or lighting purposes. Positioner 528 may include contacts on an inward-facing portion. Positioner 528 may include contact clips that are biased towards connection with a corresponding portion of mating contact portions of, for example, contactor 526. Enclosure 526 may be sealed against positioner 528 with a grommet or a sealant.

Figure 5C:
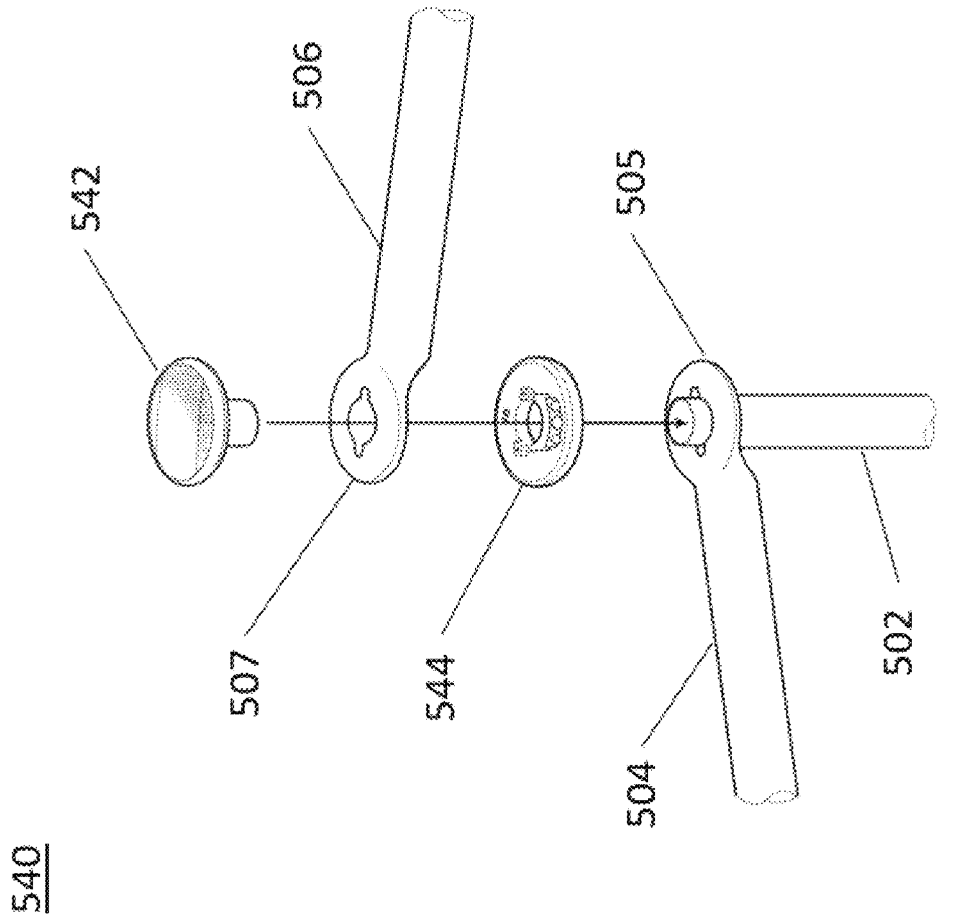

FIG. 5C illustrates an exemplary embodiment of pool frame 540. Certain features of pool frame 540 are not shown or discussed in these examples where such features may be similar to those discussed for other embodiments. Pool frame 540 may include cap 542 and positioner 544. Cap 542 may include a conducting portion for conduction power from cap 542 to positioner 544. Cap 542 may include a solar panel for generating power.

Figure 5D:
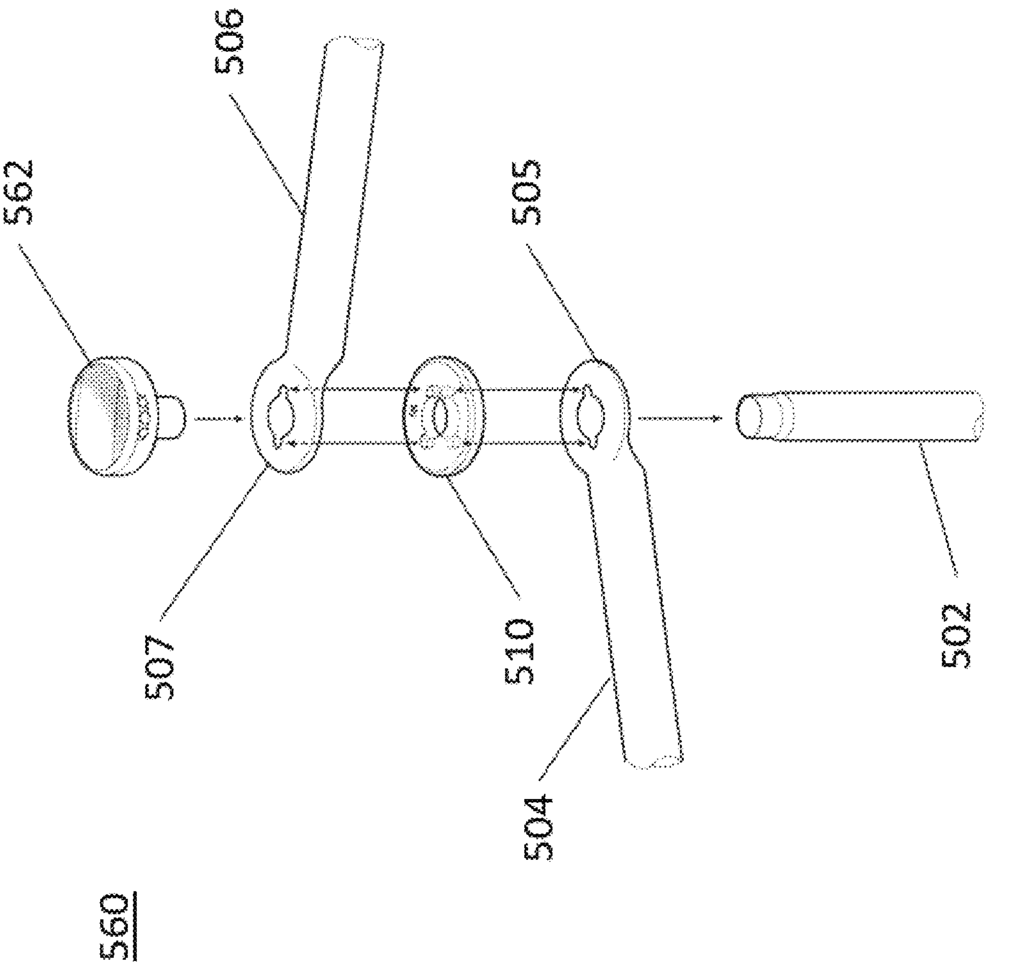

FIG. 5D illustrates an exemplary embodiment of pool frame 560. Certain features of pool frame 560 are not shown or discussed in these examples where such features may be similar to those discussed for other embodiments. Pool frame 560 may include cap 562. Cap 562 may include LEDs for aesthetic and/or lighting purposes. Cap 562 may include a solar panel to supply power to the LEDs and/or a battery. Cap 562 may include a sealed battery. Cap 562 may include a rechargeable battery and/or a disposable battery.

Figure 5E:
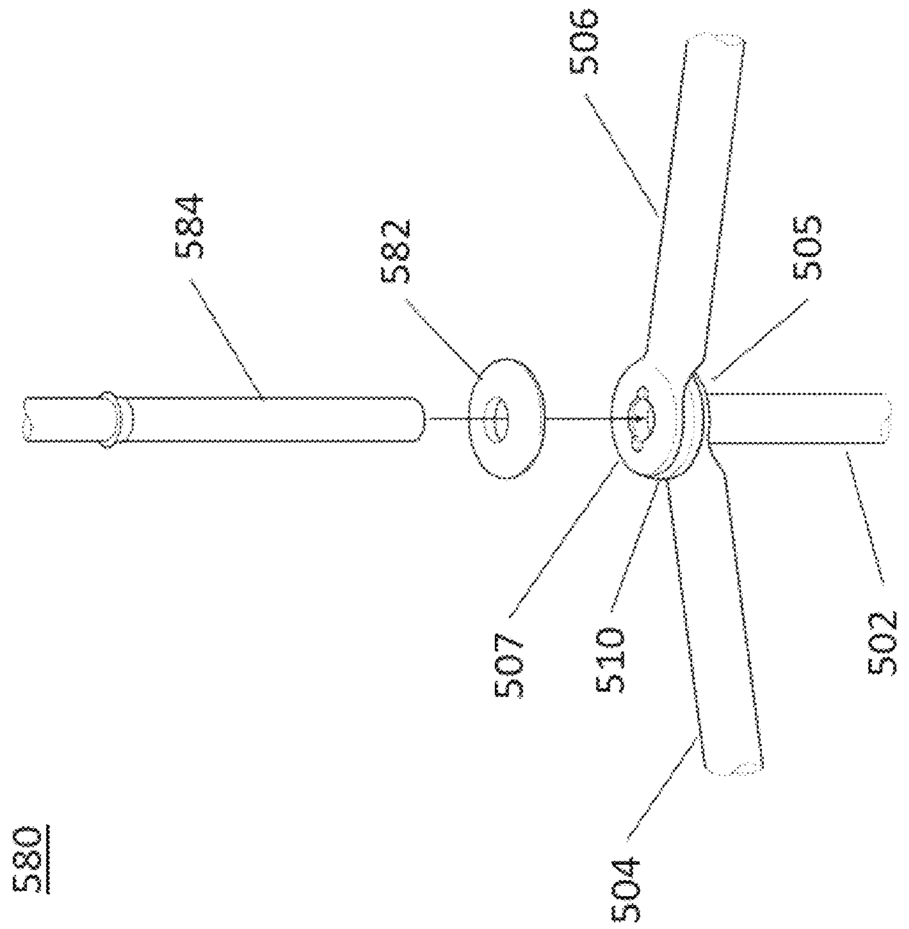

FIG. 5E illustrates an exemplary embodiment of pool frame 580. Certain features of pool frame 580 are not shown or discussed in these examples where such features may be similar to those discussed for other embodiments. Pool frame 580 may include cap 582 and support 584. Cap 582 may attach to at least one of end 507, positioner 510, end 505, or vertical member 502. Cap 582 may attach via a press fit, adhesive, and/or threaded connection. Support 584 may attach to at least one of cap 582, end 507, positioner 510, end 505, or vertical member 502. Support 584 may be press fit into vertical member 502. In some embodiments, support 584 may attach via a press fit, adhesive, and/or threaded connection. Support 584 may hold cap 584 against a top portion of end 507. Support 584 may be used for a number of devices or pool accessories alone or in combination, including an umbrella, a screen, a speaker, a goal, or a ladder.

It is understood that while certain embodiments are discussed to facilitate understanding of various principles and aspects of this disclosure, the embodiments are not described in isolation and the descriptions are not necessarily mutually exclusive. Thus, it is contemplated and understood that described features of principles of any embodiment may be incorporated into other embodiments.

It will be apparent to those skilled in the art that various modifications and variations can be made to the disclosed pool, pool liner, frame members, and connections. While illustrative embodiments have been described herein, the scope of the invention includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit of the invention being indicated by the following claims and their full scope of equivalents.

What is claimed is:

1. A pool frame assembly comprising:
- a frame member;
- a first beam having a first connecting end;
- a second beam having a second connecting end, wherein the first and second connecting ends are configured to fit onto a mating end portion of the frame member;
- a locking cap configured to secure the first and second beams in a position relative to the frame member; and
- a pin configured to be received through connection holes in the first and second connecting ends to fix an orientation of the first beam relative to the second beam,
- wherein the first and second connecting ends comprise indicators for aligning the first and second beams to form a portion of a desired circumference of a pool.

2. The pool frame assembly of claim 1, wherein the indicators are selected from the group consisting of silk screen, tempo print, decal, and engraving; and the indicators indicate an angle or a setting number corresponding to a circumference of the pool.

3. The pool frame assembly of claim 1, wherein the indicators indicate a location at which to place the pin to achieve a desired circumference of the pool.

4. The pool frame assembly of claim 2, wherein the indicators are visible through a hole, window, or aperture of the first connecting end.

5. The pool frame assembly of claim 1, wherein the locking cap comprises a locking portion configured to mate with the pin through a threaded, adhesive, welded, and/or press fit connection.

6. The pool frame assembly of claim 1, further comprising an enclosure configured to house a battery, wherein the enclosure is sealed from moisture and debris and is configured to conduct power to a positioner comprising light-emitting diodes (LEDs).

7. The pool frame assembly of claim 1, wherein the locking cap comprises a solar panel for generating power, and the locking cap further comprises LEDs, powered by the solar panel or a battery housed within the cap.

8. A pool frame assembly comprising:
- a frame member;
- a first beam having a first connecting end;
- a second beam having a second connecting end;
- a locking cap;
- a pin; and
- indicators configured to indicate an angle, a circumference of a pool comprising the pool frame assembly, or a setting number that corresponds to a circumference of the pool.

9. The pool frame assembly of claim 8, wherein the first and second connecting ends each comprise an indicator of the indicators to orient the first connecting end and the second connecting end in a position relative to each other.

10. The pool frame assembly of claim 9, wherein the indicators are selected from the group consisting of a silk screen, tempo print, decal, and engraving.

11. The pool frame assembly of claim 8, wherein the indicators are configured to indicate a location at which to place the pin to achieve a desired circumference of the pool.

12. The pool frame assembly of claim 8, wherein the first connecting end is located between the second connecting end and the locking cap and wherein the indicators are visible through a hole, a window, or an aperture of the first connecting end.

13. The pool frame assembly of claim 8, wherein the locking cap mates with the frame member via a connection selected from the group consisting of a threaded connection, an adhesive connection, a welded connection, and a press fit connection.

14. A pool frame assembly comprising:
- a frame member;
- a first beam comprising an end with a first slot;
- a second beam comprising an end with a second slot;
- a cap configured to attach to a top portion of the frame member and to a portion of the first beam and the second beam; and
- a positioner configured to connect the first beam and the second beam at a desired orientation, the positioner comprising:
  - a first protruding portion configured to insert into the first slot of the first beam; and a second protruding portion configured to insert into the second slot of the second beam.

15. The pool frame assembly of claim 14, wherein the cap further comprises an insert portion configured to press fit within or outside a portion of the frame member.

16. The pool frame assembly of claim 14, wherein the positioner comprises a plurality of locating portions comprising protrusions, slots, and location holes for mating with corresponding portions of the end of the first beam and the end of the second beam.

17. The pool frame assembly of claim 14, wherein the positioner comprises an adjustable pin configured to lock the positioner in a location corresponding to the desired circumference.

18. The pool frame assembly of claim 14, further comprising a battery and an enclosure, wherein the battery is placed within the enclosure, and the enclosure is configured to conduct power from the cap to the positioner.

19. The pool frame assembly of claim 18, wherein the positioner comprises light-emitting diodes (LEDs).

20. The pool frame assembly of claim 14, wherein the cap comprises a solar panel for generating power and conducting power to the positioner.

* * * * *